(12) United States Patent
Takada et al.

(10) Patent No.: US 9,707,897 B2
(45) Date of Patent: Jul. 18, 2017

(54) IMAGE DISPLAY MIRROR FOR A VEHICLE

(71) Applicant: NITTO DENKO CORPORATION, Ibaraki-shi, Osaka (JP)

(72) Inventors: Katsunori Takada, Ibaraki (JP); Tadayuki Kameyama, Ibaraki (JP); Yoshitsugu Kitamura, Ibaraki (JP); Keisuke Kimura, Ibaraki (JP); Hiroki Kuramoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/011,858

(22) Filed: Feb. 1, 2016

(65) Prior Publication Data

US 2016/0221509 A1 Aug. 4, 2016

(30) Foreign Application Priority Data

Feb. 2, 2015 (JP) ................................ 2015-018656

(51) Int. Cl.
  *B60R 1/12* (2006.01)
  *G02B 27/28* (2006.01)
  *G02B 5/30* (2006.01)
  *G02B 27/14* (2006.01)
  *B60R 1/08* (2006.01)
  *G02F 1/1335* (2006.01)
  *G02B 5/08* (2006.01)

(52) U.S. Cl.
  CPC ................ *B60R 1/12* (2013.01); *B60R 1/083* (2013.01); *B60R 1/084* (2013.01); *B60R 1/088* (2013.01); *G02B 5/3083* (2013.01); *G02B 27/144* (2013.01); *G02B 27/281* (2013.01); *G02F 1/133536* (2013.01); *G02F 1/133553* (2013.01); *B60R 2001/1215* (2013.01); *G02B 5/08* (2013.01); *G02F 2001/133545* (2013.01); *G02F 2001/133567* (2013.01)

(58) Field of Classification Search
  CPC ...... B60R 1/12; G02B 27/144; G02B 27/281; G02B 5/3083
  See application file for complete search history.

(56) References Cited

U.S. PATENT DOCUMENTS

2009/0096937 A1 4/2009 Bauer et al.
2009/0296190 A1 12/2009 Anderson et al.
2014/0347488 A1 11/2014 Tazaki et al.

FOREIGN PATENT DOCUMENTS

JP   5273286 B1   8/2013

OTHER PUBLICATIONS

European Search Report dated Jun. 8, 2016, issued in counterpart European Patent Application No. 16153592.7. (7 pages).

*Primary Examiner* — Joseph L Williams
(74) *Attorney, Agent, or Firm* — Westerman, Hattori, Daniels & Adrian, LLP

(57) ABSTRACT

An image display mirror for a vehicle includes a first polarizing plate arranged so as to be rotatable in a plane, a half mirror having a reflection axis and configured to reflect polarized light, and an image display apparatus in the stated order from a viewer side, in which: the first polarizing plate has a polarizer; a rotation of the first polarizing plate changes an angle of an absorption axis of the polarizer relative to a reflection axis of the half mirror when an image is not displayed on the image display apparatus and when the image is displayed thereon; when the image is not displayed, the absorption axis of the polarizer and the reflection axis of the half mirror are perpendicular to each other; and when the image is displayed, the absorption axis of the polarizer and the reflection axis of the half mirror are parallel to each other.

5 Claims, 3 Drawing Sheets

IMAGE DISPLAY MIRROR FOR A VEHICLE

This application claims priority under 35 U.S.C. Section 119 to Japanese Patent Application No. 2015-018656 filed on Feb. 2, 2015, which is herein incorporated by references.

BACKGROUND OF THE INVENTION

1. Field of the Invention

The present invention relates to an image display mirror for a vehicle.

2. Description of the Related Art

A technology involving combining a rear-view mirror for a vehicle with an image display apparatus to display an image has heretofore been known. For example, Japanese Patent No. 5273286 discloses an image display mirror including a half mirror arranged on the front surface (viewer side surface) of a monitor. In the image display mirror, the rear can be viewed with a reflected image provided by the half mirror. Meanwhile, when an image is displayed on the monitor, the image can be viewed through the half mirror.

Such image display mirror involves a problem in that, for example, when the quantity of light from the rear of a vehicle is large, the reflected image inhibits the visibility of an image displayed on the monitor. Japanese Patent No. 5273286 proposes the following technology. An influence of the reflected image is reduced by making the angle of the half mirror when a viewer (occupant) views the rear and the angle when the viewer views the image of the monitor different from each other. According to such technology, the influence of the reflected image provided by the half mirror can be reduced by adjusting the angle of the half mirror so that when the monitor image is viewed, the reflected image becomes an image that does not inhibit the visibility of the monitor image, specifically so that a ceiling is mirrored by reflection.

However, when it is difficult to turn the reflected image provided by the half mirror into the image that does not inhibit the visibility of the monitor image, e.g., when the image display mirror of Japanese Patent No. 5273286 is applied to a vehicle including a ceiling that transmits light, such as a panoramic roof or a sunroof, or a convertible car, the influence of the reflected image cannot be reduced by the mirror.

SUMMARY OF THE INVENTION

The present invention has been made to solve the conventional problems, and an object of the present invention is to provide an image display mirror that includes a half mirror and an image display apparatus, reduces an influence of a reflected image provided by the half mirror, and is excellent in visibility of an image displayed on the image display apparatus.

An image display mirror for a vehicle according to one embodiment of the present invention includes a first polarizing plate arranged so as to be rotatable in a plane, a half mirror having a reflection axis and being configured to reflect polarized light, and an image display apparatus in the stated order from a viewer side, in which: the first polarizing plate has a polarizer; a rotation of the first polarizing plate changes an angle of an absorption axis of the polarizer relative to a reflection axis of the half mirror when an image is not displayed on the image display apparatus and when the image is displayed thereon; when the image is not displayed, the absorption axis of the polarizer and the reflection axis of the half mirror are perpendicular to each other; and when the image is displayed, the absorption axis of the polarizer and the reflection axis of the half mirror are parallel to each other.

In one embodiment of the present invention, the first polarizing plate is subjected to a low-reflection treatment.

In one embodiment of the present invention, the image display mirror for a vehicle further includes a λ/4 plate on a viewer side of the first polarizing plate.

In one embodiment of the present invention, the image display apparatus includes a liquid crystal display apparatus including a liquid crystal cell, and the liquid crystal display apparatus is free of a polarizing plate on a viewer side of the liquid crystal cell.

According to another embodiment of the present invention, there is provided a method of observing surroundings of a vehicle. The method is a method by which a driver of a vehicle observes surroundings of the vehicle with the above-mentioned image display mirror for a vehicle, the method including: switching attached and removed states of the first polarizing plate when an image is displayed on the image display apparatus and when the image is not displayed thereon; and arranging, when the image is displayed, the first polarizing plate between the half mirror and the driver of the vehicle.

The image display mirror for a vehicle according to the embodiment of the present invention includes the polarizing plate arranged so as to be rotatable in a plane, the half mirror configured to reflect polarized light, and the image display apparatus in the stated order from the viewer side. In such image display mirror for a vehicle, an influence of a reflected image provided by the half mirror is reduced, and hence the visibility of an image displayed on the image display apparatus is excellent.

DETAILED DESCRIPTION OF THE PREFERRED EMBODIMENTS

Embodiments of the present invention are hereinafter described with reference to the drawings. However, the present invention is not limited to these embodiments.

A. Overall Construction of Image Display Mirror for Vehicle

Figure 1:
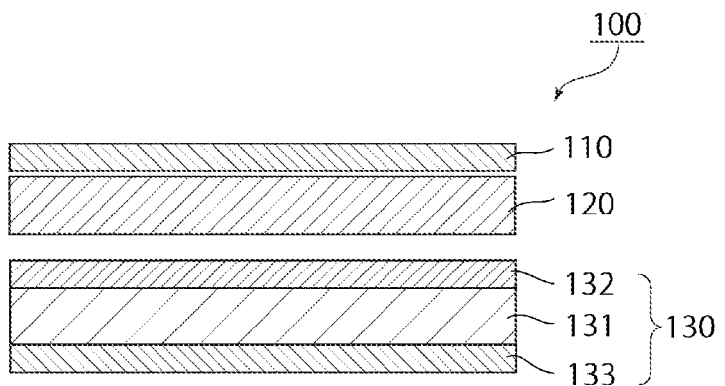
FIG. 1 is a schematic sectional view of an image display mirror according to one embodiment of the present invention.

FIG. 1 is a schematic sectional view of an image display mirror according to one embodiment of the present invention. An image display mirror 100 for a vehicle includes a first polarizing plate 110 arranged so as to be rotatable in a plane, a half mirror 120, and an image display apparatus 130 in the stated order from a viewer side. The half mirror 120 and the image display apparatus 130 are preferably arranged so as to be parallel to each other. The image display mirror for a vehicle of this embodiment can be used as, for example, the rear-view mirror (room mirror) of a vehicle. The half mirror 120 has a light-reflecting function and a light-transmitting function. The image display mirror 100 for a vehicle enables an occupant (more specifically, a driver) of the vehicle to observe the surroundings (e.g., the rear) of the vehicle by virtue of the light-reflecting function of the half mirror 120. In addition, in the image display mirror 100 for a vehicle, an image displayed on the image display apparatus 130 can be viewed by virtue of the light-transmitting function of the half mirror 120. The image display apparatus 130 displays, for example, an image provided by an external camera that mirrors the surroundings (e.g., the rear) of the vehicle. With such construction, even, for example, when an obstacle (such as a passenger or baggage) is present in the vehicle and hence the surroundings of the vehicle cannot be sufficiently observed with the reflected image of the half mirror, the safety of the vehicle can be secured by displaying the image provided by the external camera on the image display apparatus. It should be noted that, although not illustrated, the image display mirror for a vehicle of the present invention may further include any appropriate other member.

The half mirror is a half mirror that can reflect polarized light. More specifically, the half mirror has a reflection axis and a transmission axis perpendicular to each other, and can reflect polarized light whose polarization direction is parallel to the reflection axis and transmit polarized light whose polarization direction is parallel to the transmission axis.

As described above, the image display mirror for a vehicle of the present invention includes the first polarizing plate arranged so as to be rotatable in a plane. More specifically, in the image display mirror for a vehicle of the present invention, the rotation of the first polarizing plate (rotation by preferably from 85° to 95°, more preferably from 88° to 92°, still more preferably 90°) changes the angle of the absorption axis of the polarizer of the first polarizing plate relative to the reflection axis of the half mirror when the image is not displayed on the image display apparatus and when the image is displayed thereon. When the image is not displayed, the absorption axis of the polarizer and the reflection axis of the half mirror are perpendicular to each other. Meanwhile, when the image is displayed, the absorption axis of the polarizer and the reflection axis of the half mirror are parallel to each other. It should be noted that the term "rotation in a plane" as used herein does not mean a strict rotation in the plane, but means such a rotation that the angle between the absorption axis of the polarizer and the reflection axis of the half mirror when viewed from the viewer side can change from a perpendicular angle to a parallel angle or from the parallel angle to the perpendicular angle to the extent that a viewer can view the half mirror through the first polarizing plate. In addition, the term "parallel" as used herein includes the case where the axes are substantially parallel to each other. Here, the phrase "substantially parallel" includes the case where an angle between the axes is 0°±110°, and the angle is preferably 0°±7°, more preferably 0°±5°. Further, the term "perpendicular" as used herein includes the case where the axes are substantially perpendicular to each other. Here, the phrase "substantially perpendicular" includes the case where the angle between the axes is 90°±10°, and the angle is preferably 90°±7°, more preferably 90°±5°.

Figure 2A:
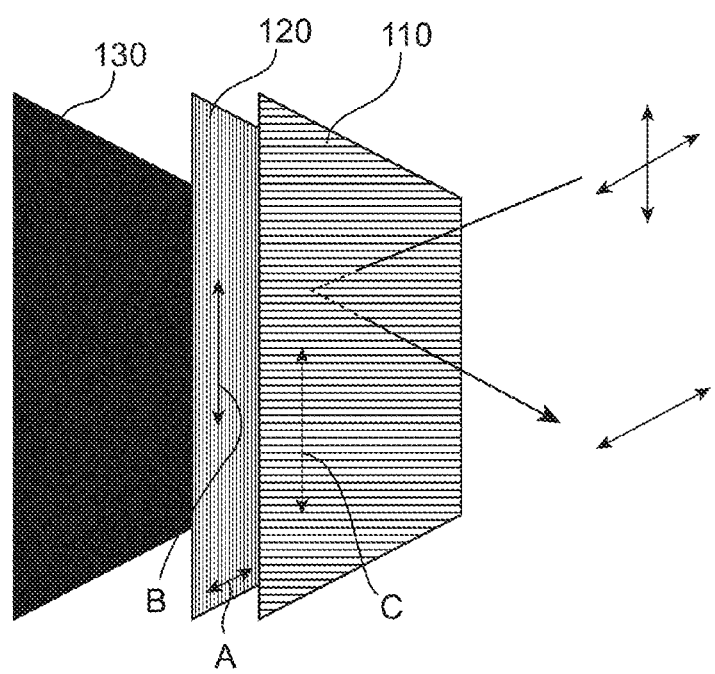
FIG. 2A and FIG. 2B are each a schematic view for illustrating an action according to the one embodiment of the present invention.
Figure 2B:
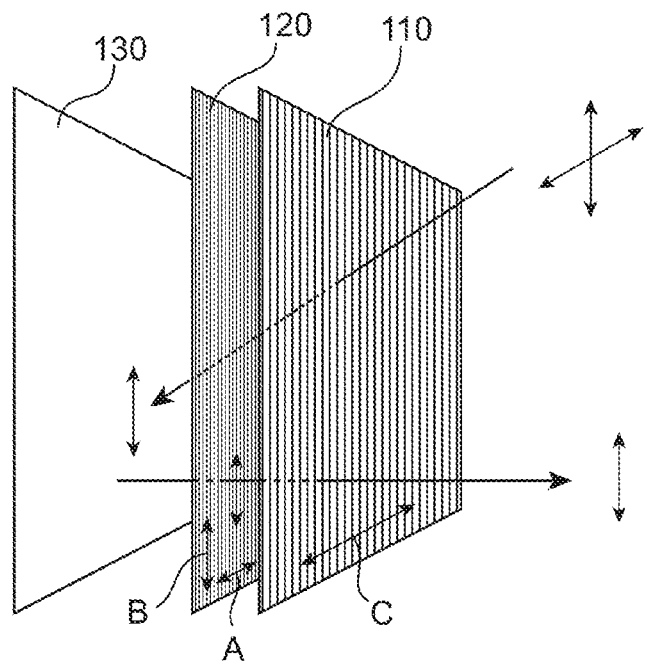

FIG. 2A and FIG. 2B are each a schematic view for illustrating an action according to the one embodiment of the present invention. In FIG. 2A, a state in which the image is not displayed on the image display apparatus 130 and the reflected image provided by the half mirror 120 is subjected to viewing is illustrated. In this state, the first polarizing plate 110 is arranged so that an absorption axis C of the polarizer of the first polarizing plate 110 and a reflection axis A of the half mirror 120 are perpendicular to each other. Accordingly, polarized light generated by transmission through the first polarizing plate 110 from the viewer side becomes polarized light whose polarization direction is parallel to the reflection axis A, and is reflected by the half mirror 120. In addition, the reflected light is transmitted through the first polarizing plate 110. As a result, the occupant of the vehicle can view the reflected image provided by the half mirror 120. In FIG. 2B, a state in which the image is displayed on the image display apparatus 130 is illustrated, and the first polarizing plate rotates by about 90° from the state of FIG. 2A. In this state, the first polarizing plate 110 is arranged so that the absorption axis C of the polarizer of the first polarizing plate 110 and the reflection axis A of the half mirror 120 are parallel to each other. Accordingly, the polarized light generated by the transmission through the first polarizing plate 110 from the viewer side becomes polarized light whose polarization direction is perpendicular to the reflection axis A (i.e., parallel to a transmission axis B), and is transmitted through the half mirror 120. As a result, the reflected image provided by the half mirror 120 becomes difficult to view. On the other hand, the light transmitted through the half mirror 120 from the image display apparatus 130 is polarized light that can be transmitted through the first polarizing plate 110, and hence the image of the image display apparatus 130 is subjected to the viewing. As described above, according to the image display mirror for a vehicle of the present invention, the influence of the reflected image provided by the half mirror 120 is reduced and hence the visibility of the image displayed on the image display apparatus 130 can be improved.

Any appropriate mechanism can be adopted as a mechanism for rotating the first polarizing plate as long as the effects of the present invention are obtained. For example, such a mechanism that the first polarizing plate is held with a frame body and the first polarizing plate is rotated in the frame body (preferably rotated by 90° as one unit) is given.

The half mirror and the image display apparatus may be brought into contact with each other or may be out of contact with each other. It is preferred that a gap between the half mirror and the image display apparatus be filled with a transparent resin, and both the members be brought into close contact with each other. When both the members are brought into close contact with each other as described above, an image display mirror for a vehicle excellent in efficiency with which light is utilized and excellent in visibility of a displayed image can be obtained. Any appropriate resin film, pressure-sensitive adhesive, or the like can be used in interlayer filling. A pressure-sensitive adhesive excellent in transparency is preferably used as the pressure-sensitive adhesive. Examples thereof include an acrylic pressure-sensitive adhesive, a silicone-based pressure-sensitive adhesive, and a rubber-based pressure-sensitive adhesive.

In one embodiment, a λ/4 plate can be arranged on the viewer side (i.e., the side opposite to the half mirror) of the first polarizing plate. The λ/4 plate has a function of transforming linearly polarized light into circularly polarized light (or circularly polarized light into linearly polarized light) by arranging its slow axis at an angle of about +45° or about −45° relative to the absorption axis of the first polarizing plate (details are described later). The arrangement of the λ/4 plate can provide an image display mirror for a vehicle excellent in visibility for a user of a pair of polarized sunglasses. It should be noted that the λ/4 plate may be brought into contact with the first polarizing plate or may be out of contact therewith. In addition, the λ/4 plate and the first polarizing plate may be bonded to each other through intermediation of a pressure-sensitive adhesive layer. Further, the λ/4 plate may be arranged removably and attachably.

B. First Polarizing Plate

The first polarizing plate typically has a polarizer and a protective layer arranged on one side, or each of both sides, of the polarizer. The polarizer is typically an absorption-type polarizer.

The transmittance (also referred to as "single axis transmittance") of the polarizer at a wavelength of 589 nm is preferably 41% or more, more preferably 42% or more. It should be noted that a theoretical upper limit for the single axis transmittance is 50%. In addition, its polarization degree is preferably from 99.5% to 100%, more preferably from 99.9% to 100%.

Any appropriate polarizer may be used as the polarizer. Examples thereof include: a polarizer obtained by adsorbing a dichroic substance, such as iodine or a dichroic dye, onto a hydrophilic polymer film, such as a polyvinyl alcohol-based film, a partially formalized polyvinyl alcohol-based film, or an ethylene-vinyl acetate copolymer-based partially saponified film, and subjecting the resultant film to uniaxial stretching; and polyene-based alignment films, such as a dehydrated product of polyvinyl alcohol and a dehydrochlorinated product of polyvinyl chloride. Of those, a polarizer obtained by adsorbing a dichroic substance, such as iodine, onto a polyvinyl alcohol-based film and subjecting the resultant film to uniaxial stretching is particularly preferred because of its high polarized dichromaticity. The polarizer has a thickness of preferably from 0.5 μm to 80 μm.

The polarizer obtained by adsorbing iodine onto a polyvinyl alcohol-based film and subjecting the resultant film to uniaxial stretching is typically produced by dyeing polyvinyl alcohol through immersion in an aqueous solution of iodine and stretching the resultant film at a ratio of from 3 times to 7 times with respect to its original length. The stretching may be carried out after the dyeing, the stretching may be carried out during the dyeing, or the stretching may be carried out before the dyeing. The polarizer may be produced by subjecting the film to treatments such as swelling, cross-linking, adjusting, washing with water, and drying in addition to the stretching and the dyeing.

Any appropriate film may be used as the protective layer. As a material for the main component of such film, there are specifically given, for example: cellulose-based resins, such as triacetylcellulose (TAC); and transparent resins, such as (meth)acrylic, polyester-based, polyvinyl alcohol-based, polycarbonate-based, polyamide-based, polyimide-based, polyether sulfone-based, polysulfone-based, polystyrene-based, polynorbornene-based, polyolefin-based, or acetate-based transparent resins. In addition, examples thereof further include thermosetting resins and UV curable resins, such as acrylic, urethane-based, acrylic urethane-based, epoxy-based, or silicone-based thermosetting resins and UV curable resins. In addition, examples thereof further include glassy polymers, such as a siloxane-based polymer. In addition, a polymer film described in Japanese Patent Application Laid-open No. 2001-343529 (International Patent WO01/37007A) may also be used. For example, a resin composition containing a thermoplastic resin having in its side chain a substituted or unsubstituted imide group and a thermoplastic resin having in its side chain a substituted or unsubstituted phenyl group and a nitrile group may be used as a material for the film. An example thereof is a resin composition containing an alternating copolymer formed of isobutene and N-methylmaleimide and an acrylonitrile-styrene copolymer. The polymer film may be, for example, an extruded product of the resin composition.

In one embodiment, the first polarizing plate is subjected to a low-reflection treatment. The surface of the protective layer is preferably subjected to the low-reflection treatment. The low-reflection treatment is, for example, a treatment involving forming a layer, such as a fluorine-based resin layer, a multilayer metal-deposited layer, an optical interference layer, or a layer having a fine uneven shape (e.g., a moth-eye structure).

C. Half Mirror

A reflective polarizing plate including a reflective polarizer is used as the half mirror. The reflective polarizer has functions of transmitting polarized light in a specific polarization state (polarization direction) and reflecting light in a polarization state except the foregoing. The reflective polarizer is preferably of a linearly polarized light separation type.

Figure 3:
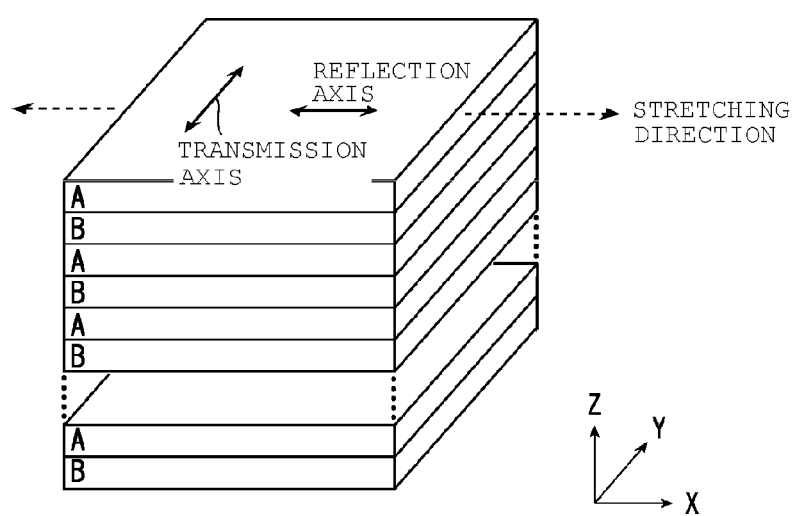
FIG. 3 is a schematic perspective view of an example of a reflective polarizer to be used in the one embodiment of the present invention.

FIG. 3 is a schematic perspective view of an example of the reflective polarizer. The reflective polarizer is a multilayer laminate in which a layer A having birefringence and a layer B substantially free of birefringence are alternately laminated. The total number of the layers of such multilayer laminate can be, for example, from 50 to 1,000. In the illustrated example, a refractive index nx of the layer A in an x-axis direction is larger than a refractive index ny thereof in a y-axis direction, and a refractive index nx of the layer B in the x-axis direction and a refractive index ny thereof in the y-axis direction are substantially equal to each other. Therefore, a refractive index difference between the layer A and the layer B is large in the x-axis direction, and is substantially zero in the y-axis direction. As a result, the x-axis direction serves as a reflection axis and the y-axis direction serves as a transmission axis. The refractive index difference between the layer A and the layer B in the x-axis direction is preferably from 0.2 to 0.3. It should be noted that the x-axis direction corresponds to the stretching direction of the reflective polarizer.

The layer A is preferably constituted of a material that expresses birefringence when stretched. Typical examples of such material include naphthalene dicarboxylic acid polyester (such as polyethylene naphthalate), polycarbonate, and an acrylic resin (such as polymethyl methacrylate). Of those, polyethylene naphthalate is preferred. The layer B is preferably constituted of a material that is substantially free from expressing birefringence even when stretched. A typical example of such material is the copolyester of naphthalene dicarboxylic acid and terephthalic acid.

The reflective polarizer transmits light having a first polarization direction (such as a p-wave) at an interface between the layer A and the layer B, and reflects light having a second polarization direction perpendicular to the first polarization direction (such as an s-wave) at the interface. Part of the reflected light is transmitted as light having the first polarization direction, and other part thereof is reflected as light having the second polarization direction at the interface between the layer A and the layer B.

The total thickness of the reflective polarizer can be appropriately set in accordance with, for example, purposes and the total number of the layers in the reflective polarizer. The total thickness of the reflective polarizer is preferably from 10 μm to 150 μm.

The reflective polarizer can be typically produced by combining co-extrusion and lateral stretching. The co-extrusion can be performed by any appropriate system. For example, a feed block system is permitted, or a multi-manifold system is permitted. For example, the material for constituting the layer A and the material for constituting the layer B are extruded in a feed block, and then the resultant is turned into a plurality of layers with a multiplier. It should be noted that such apparatus for turning the materials into the plurality of layers is known to a person skilled in the art. Next, the resultant elongated multilayer laminate is typically stretched in a direction (TD) perpendicular to a conveying direction. The material for constituting the layer A (such as polyethylene naphthalate) is increased in refractive index only in the stretching direction by the lateral stretching, and as a result, expresses birefringence. The material for constituting the layer B (such as the copolyester of naphthalene dicarboxylic acid and terephthalic acid) is not increased in refractive index in any direction even by the lateral stretching. As a result, a reflective polarizer having a reflection axis in the stretching direction (TD) and having a transmission axis in the conveying direction (MD) can be obtained (the TD corresponds to the x-axis direction of FIG. 3 and the MD corresponds to the y-axis direction thereof). It should be noted that a stretching operation can be performed with any appropriate apparatus.

Another example of the linearly polarized light separation-type reflective polarizer is such a polarizing fiber or polarizing woven fabric as described in Japanese Patent Application Laid-open No. 2009-24318. The performance of the reflective polarizer improves as a refractive index difference in a direction perpendicular to the lengthwise direction of the polarizing fiber becomes smaller and a refractive index difference in the lengthwise direction of the polarizing fiber becomes larger. Still another example of the linearly polarized light separation-type reflective polarizer is such a wire grid polarizer as described in Japanese Patent Application Laid-open No. 2011-48630.

A commercial product may be directly used as the reflective polarizer, or the commercial product may be subjected to secondary processing (such as stretching) before use. Examples of the commercial product include a product available under the trade name "DBEF" from 3M Company and a product available under the trade name "APF" from 3M Company. In addition, the wire grid polarizer is, for example, a product available under the trade name "WGFTM" from Asahi Kasei E-materials.

D. Image Display Apparatus

Any appropriate apparatus can be used as the image display apparatus. Examples thereof include a liquid crystal display apparatus, an organic EL display apparatus, and a plasma display apparatus. Description is given below by taking the liquid crystal display apparatus as a typical example. In one embodiment, as the liquid crystal display apparatus, there is used an image display apparatus including, as illustrated in FIG. 1, a liquid crystal panel including a liquid crystal cell 131, a second polarizing plate 132 arranged on the viewer side of the liquid crystal cell 131, and a third polarizing plate 133 arranged on the back surface side of the liquid crystal cell 131. It should be noted that, although not illustrated, the image display apparatus may include any appropriate other member (such as a backlight unit) as required.

D-1. Liquid Crystal Cell

The liquid crystal cell 131 has a pair of substrates and a liquid crystal layer serving as a display medium sandwiched between the substrates. In a general construction, a color filter and a black matrix are arranged on one of the substrates, and a switching element for controlling the electrooptical characteristics of liquid crystal, a scanning line for providing the switching element with a gate signal and a signal line for providing the element with a source signal, and a pixel electrode and a counter electrode are arranged on the other substrate. An interval between the substrates (cell gap) can be controlled with, for example, a spacer. For example, an alignment film formed of polyimide can be arranged on the side of each of the substrates to be brought into contact with the liquid crystal layer.

In one embodiment, the liquid crystal layer contains liquid crystal molecules aligned in a homogeneous array under a state in which no electric field is present. Such liquid crystal layer (resultantly the liquid crystal cell) typically shows a three-dimensional refractive index of nx>ny=nz. It should be noted that the expression "ny=nz" as used herein includes not only the case where ny and nz are completely equal to each other but also the case where ny and nz are substantially equal to each other. Typical examples of a driving mode using the liquid crystal layer showing such three-dimensional refractive index include an in-plane switching (IPS) mode and a fringe field switching (FFS) mode. It should be noted that the IPS mode includes a super in-plane switching (S-IPS) mode and an advanced super in-plane switching (AS-IPS) mode each adopting a V-shaped electrode, a zigzag electrode, or the like. In addition, the FFS mode includes an advanced fringe field switching (A-FFS) mode and an ultra fringe field switching (U-FFS) mode each adopting a V-shaped electrode, a zigzag electrode, or the like.

In another embodiment, the liquid crystal layer contains liquid crystal molecules aligned in a homeotropic array under a state in which no electric field is present. Such liquid crystal layer (resultantly the liquid crystal cell) typically shows a three-dimensional refractive index of nz>nx=ny. A driving mode using the liquid crystal molecules aligned in the homeotropic array under a state in which no electric field is present is, for example, a vertical alignment (VA) mode. The VA mode includes a multi-domain VA (MVA) mode.

D-2. Second Polarizing Plate and Third Polarizing Plate

Such polarizing plate as described in the section B is used as each of the second polarizing plate and the third polarizing plate.

The second polarizing plate and the third polarizing plate can be arranged so that the absorption axes of their respective polarizers are substantially perpendicular or parallel to each other to enable the viewing of an image. In addition, the second polarizing plate is preferably arranged so that the absorption axis of the second polarizing plate and the reflection axis of the half mirror are parallel to each other.

In one embodiment, the second polarizing plate 132 is omitted from the image display apparatus (liquid crystal display apparatus) 130 illustrated in FIG. 1. That is, in this embodiment, a liquid crystal display apparatus free of a polarizing plate on the viewer side of its liquid crystal cell is used. In this embodiment, the brightness of the image display mirror for a vehicle can be improved because an optical loss due to the second polarizing plate can be eliminated. In this embodiment, when the first polarizing plate is brought into the attached state, the first polarizing plate and the third polarizing plate are arranged so that the absorption axes of their respective polarizers are substantially perpendicular or parallel to each other to enable the viewing of an image. In addition, in this embodiment, the liquid crystal display apparatus can be configured so that polarized light output from the liquid crystal display apparatus can be transmitted through the half mirror.

E. λ/4 Plate

In one embodiment, as described above, the λ/4 plate is arranged on the viewer side (i.e., the side opposite to the half mirror) of the first polarizing plate.

A front retardation $R_0$ of the λ/4 plate at a wavelength of 590 nm is from 90 nm to 190 nm, preferably from 100 nm to 180 nm, more preferably from 110 nm to 170 nm. It should be noted that the front retardation $R_0$ in this specification is determined from the equation "$R_0=(nx-ny)\times d$" where nx represents a refractive index in the direction in which an in-plane refractive index becomes maximum (i.e., a slow axis direction), ny represents a refractive index in a direction perpendicular to the slow axis in a plane (i.e., a fast axis direction), and d (nm) represents the thickness of a retardation film, the parameters being values under 23° C. The λ/4 plate shows any appropriate refractive index ellipsoid as long as the plate has the relationship of nx>ny. For example, the refractive index ellipsoid of the λ/4 plate shows the relationship of nx>nz>ny or nx>ny≥nz.

An angle between the absorption axis of the polarizer of the first polarizing plate and the slow axis of the λ/4 plate is preferably from +40° to +50° or from −40° to −50°, more preferably from +43° to +47° or from −43° to −47°, still more preferably +45° or −45°. When the first polarizing plate and the λ/4 plate are arranged so as to show such relationship, the laminated structure of the first polarizing plate and the λ/4 plate can function as a circularly polarizing plate.

Any appropriate material can be used as a material for constituting the λ/4 plate as long as the effects of the present invention are obtained. A typical example thereof is a stretched film of a polymer film. Examples of a resin for forming the polymer film include a polycarbonate-based resin and a cycloolefin-based resin. A method of producing the λ/4 plate is not particularly limited, but the λ/4 plate can be obtained by, for example, stretching the polymer film at a temperature of from about 100° C. to about 250° C. and at a stretching ratio of from about 1.1 times to about 2.5 times. The front retardation and thickness direction retardation of the λ/4 plate can be controlled by adjusting the stretching ratio and stretching temperature of the polymer film. The thickness and total light transmittance of the λ/4 plate are preferably about 200 μm or less and 80% or more, respectively, though the thickness and the total light transmittance are not particularly limited thereto.

What is claimed is:

1. An image display mirror for a vehicle, comprising a first polarizing plate configured so as to be rotatable in a plane, a half mirror having a reflection axis and being configured to reflect polarized light, and an image display apparatus in the stated order from a viewer side, wherein:
    the first polarizing plate has a polarizer;
    the first polarizing plate is rotatably configured such that a rotation of the first polarizing plate changes an angle of an absorption axis of the polarizer relative to a reflection axis of the half mirror when an image is not displayed on the image display apparatus and when the image is displayed thereon;
    the first polarizing plate is rotatably configured such that, when the image is not displayed, the absorption axis of the polarizer and the reflection axis of the half mirror are perpendicular to each other; and
    the first polarizing plate is rotatably configured such that, when the image is displayed, the absorption axis of the polarizer and the reflection axis of the half mirror are parallel to each other.

2. The image display mirror for a vehicle according to claim 1, wherein the first polarizing plate is subjected to a low-reflection treatment.

3. The image display mirror for a vehicle according to claim 1, further comprising a λ/4 plate on a viewer side of the first polarizing plate.

4. The image display mirror for a vehicle according to claim 1, wherein:
    the image display apparatus comprises a liquid crystal display apparatus including a liquid crystal cell; and
    the liquid crystal display apparatus is free of a polarizing plate on a viewer side of the liquid crystal cell.

5. A method by which a driver of a vehicle observes surroundings of the vehicle with the image display mirror for a vehicle of claim 1, the method comprising:
    switching attached and removed states of the first polarizing plate when an image is displayed on the image display apparatus and when the image is not displayed thereon; and
    arranging, when the image is displayed, the first polarizing plate between the half mirror and the driver of the vehicle.

* * * * *